US012706774B2

(12) United States Patent
Mardmöller et al.

(10) Patent No.: US 12,706,774 B2
(45) Date of Patent: Aug. 11, 2026

(54) CAN COMMUNICATION CONTROLLER AND METHOD OF OPERATING CAN COMMUNICATION CONTROLLER

(71) Applicant: Renesas Electronics Corporation, Tokyo (JP)

(72) Inventors: Christian Mardmöller, Dusseldorf (DE); Tobias Belitz, Dusseldorf (DE)

(73) Assignee: Renesas Electronics Corporation, Tokyo (JP)

( * ) Notice: Subject to any disclaimer, the term of this patent is extended or adjusted under 35 U.S.C. 154(b) by 403 days.

(21) Appl. No.: 18/362,000

(22) Filed: Jul. 31, 2023

(65) Prior Publication Data

US 2024/0039756 A1 Feb. 1, 2024

(30) Foreign Application Priority Data

Jul. 29, 2022 (EP) .................................... 22187758

(51) Int. Cl.
*H04L 12/40* (2006.01)

(52) U.S. Cl.
CPC ............................... *H04L 12/4013* (2013.01); *H04L 2012/40215* (2013.01)

(58) Field of Classification Search
CPC ........... H04L 12/40013; H04L 12/4013; H04L 12/4015; H04L 12/40163; H04L 2012/40215
See application file for complete search history.

(56) References Cited

U.S. PATENT DOCUMENTS 5,570,355 A * 10/1996 Dail ................... H04Q 11/0478 370/461
6,654,833 B1 * 11/2003 LaBerge ............. G06F 13/4031 710/123
2001/0024434 A1 * 9/2001 Ayyagari ............. H04L 47/822 370/347
2007/0104215 A1 * 5/2007 Wang .................... H04L 47/724 370/458
2015/0254198 A1 * 9/2015 Anderson ............ G06F 13/364 710/110
2016/0132444 A1 * 5/2016 Jaraudias ................ H04L 69/18 710/308
2017/0192917 A1 * 7/2017 Yates .................. G06F 13/4282
(Continued)

OTHER PUBLICATIONS

Cena, Gianluca, et. al. "A Fair Access Mechanism to Support Fragmented Data Transfers in CAN"; 2022 IEEE 18 International Convergence on Factory Communication Systems (WFCS), Pavia, Italy; Apr. 27-29, 2022. (Year: 2022).*

*Primary Examiner* — Stephen J Clawson
(74) *Attorney, Agent, or Firm* — SCULLY, SCOTT, MURPHY & PRESSER, P.C.

(57) ABSTRACT

A CAN communication controller and a method of operating a CAN communication controller are disclosed. The CAN communication controller is for transmitting first and second types of frames wherein the first type of frame is used to transmit event-triggered communication data and the second type of frame is used to transmit best effort traffic data, the CAN communication controller configured, in response to transmitting a frame of the second type having a given identifier, to delay arbitration of a following frame of the second type having the given identifier, and not to delay arbitration of a frame of the first type.

12 Claims, 8 Drawing Sheets

(56) References Cited

U.S. PATENT DOCUMENTS

2018/0242178 A1* 8/2018 Barton .................. H04W 24/08
2019/0199641 A1* 6/2019 Lo Bello ................. H04L 47/22
2021/0058424 A1* 2/2021 Chang .................. G06F 18/214

* cited by examiner

CAN COMMUNICATION CONTROLLER AND METHOD OF OPERATING CAN COMMUNICATION CONTROLLER

CROSS-REFERENCE TO RELATED APPLICATION

The subject application claims priority under 35 U.S.C. § 119 to European Patent Application No. EP 22187758, filed on Jul. 29, 2022. The entire disclosure of European Patent Application No. 22187758 is incorporated by this reference.

FIELD

The present invention relates to a CAN communication controller and a method of operating a CAN communication controller.

BACKGROUND

Controller area network (CAN) is a serial communications protocol which was originally designed for use in automotive applications, but which has now been adopted in a wide variety of other fields including heating, ventilation and air conditioning (HVAC) control systems, process control systems and medical equipment.

According to CAN, a node is able to transmit a message on a two-wire CAN bus when the bus is idle. Each message has a priority in the form of an identifier such that if two nodes transmit at the same time, then, through an arbitration process, the message having the lowest value takes priority and is transmitted, and the other message tries to re-transmit its message once the bus becomes idle again.

CAN protocols, such as CAN 2.0, CAN-FD and CAN-XL, are optimised for event-triggered bus communication.

There are disclosed techniques listed below.

[Non-Patent Document 1] G. Cena and A. Valenzano: "Achieving Round-Robin Access in Controller Area Networks", IEEE Transactions on Industrial Electronics, volume 49, no. 6, pages 1202 to 1213 (2002).

[Non-Patent Document 2] T. Beitelmal, A. El-Mandi, and H. Abdulkarim: "New Technique to Enforce a Fair Behavior in Accessing the Medium in the Controller Area Network", 2nd International Conference on Electrical Systems Design & Technologies, Hammamet Tunisia, Nov. 8-10, 2008.

In heavy traffic conditions, not only do latencies become less predictable, but also CAN may exhibit unfair behaviour, in particular, when the control applications require the same quality of service for a number of different communication objects. Non-Patent Document 1 describes an approach in which the number of times each communication object can be sent in any one frame burst (or "run") is limited. Reference is also made to Non-Patent Document 2.

The approaches disclosed in Non-Patent Document 1 and in Non-Patent Document 2, however, have at least one drawback namely losing the ability to impose strict priority which would appear to be one reason why such approaches have not been adopted. Indeed, automotive CAN networks and communication schedules generally require strict priority. To help achieve bounded latency times, the network is configured so that bus utilization is low (no more than 70%).

CAN may be deployed in situations in which other forms of data which are not event-triggered might be transmitted. These situations might only require "best effort" in which high latency might be tolerable. Although such data could in principle be transmitted using a CAN bus, it would be handled in the same way as event-triggered messages so increasing bus load and thus detrimentally affecting normal event-triggered messages. An ability to handle such data in CAN without such drawbacks would be desirable.

SUMMARY

According to a first aspect of the present disclosure there is provided a CAN communication controller for transmitting first and second types of frames wherein the first type of frame is used to transmit event-triggered communication data and the second type of frame is used to transmit best effort traffic data, the CAN communication controller configured, in response to transmitting a frame of the second type having a given identifier to delay arbitration of a following frame of the second type having the given identifier, and not to delay arbitration of a frame of the first type (or "allowing a frame of the first type to be transmitted in a normal way").

This can allow best effort traffic (such as, diagnostic data or software download) to be transmitted on a CAN bus while minimising or even avoiding impact on event-triggered communication, while maintaining, increasing or maximising CAN bus utilization. The CAN communication controller may comply with CAN 2.0, CAN-FD and/or CAN-XL.

The CAN communication controller may be configured, in response to transmitting a frame of the second type having another identifier which is different to the given identifier, to delay arbitration of a following frame of the second type having the other identifier.

The CAN communication controller may be configured, in response to transmitting the frame of the second type having the given identifier, not to delay arbitration of a frame of the second type having another, different identifier to the given identifier.

The CAN communication controller may be configured, in response to transmitting the frame of the second type having the given identifier to delay arbitration of the immediately (or "first") following frame of the second type having the given identifier (in other words, to delay arbitration of the immediately succeeding next frame with the same identifier).

The CAN communication controller may be configured, in response to transmitting the frame of the second type having the given identifier to delay arbitration of the nth following frame where $n \geq 2$) of the second type having the given identifier (in other words, not to delay arbitration of the immediately succeeding next frame with the same identifier, but of a later frame with the same identifier). This allows a short burst of best effort frames. Alternatively, the CAN communication controller may be configured, in response to transmitting the frame of the second type having the given identifier to delay arbitration after a predetermined amount of data is transmitted in at least one frame of with the same identifier. This allows a short burst of best effort frames and means that a node is able to send, for example, 1500 bytes of data in one frame or the same amount of data distributed between two or more frames (for instance, 5 frames each containing 300 bytes of data).

The first type of frame may have an identifier assignable from a first, predetermined set of identifier values, and the second type of frame may have an identifier assignable from a second, predetermined set of identifier values. The first, predetermined set of identifier values may comprise a first, higher-priority range of identifier values and the second, predetermined set of identifier values may comprise a second, lower-priority range of identifier values.

The CAN communication controller may be configured to delay arbitration by waiting a first period of time corresponding to x bits after intermission (ITM). For instance, x may be 2.

The CAN communication controller may be further configured to wait a second period of time corresponding to a further y bits. For instance, y may be 1 or may be 2.

The CAN communication controller may comprise a CAN protocol engine, a detector for detecting an end of an enhanced ITM, at least one finite state machine and a message handler. The enhanced ITM may include ITM and an additional x bits. The at least one finite state machine may include a finite state machine associated with the given identifier. The finite state machine associated with the given identifier may include a first state in which bus arbitration for the second type of frame having the given identifier is allowed and a second state in which bus arbitration for the second type of frame having the given identifier is not allowed. The message handler may include two or more transmit resources including a transmit resource for best effort traffic data having the given identifier.

The finite state machine may be configured, in response to the controller transmitting the frame of the second type having the given identifier, to transition from the first state to the second state, the detector may be configured, in response to detecting the end of the enhanced ITM, signals the end of the enhanced ITM to the finite state machine, and the finite state machine may be configured, in response the detector signalling the end of the enhanced ITM, to transition out of the second state. The finite state machine may be configured to transition out of the second state into a third state in which bus arbitration for the second type of frame having the given identifier is not allowed, and the finite state machine may be configured, in response to waiting a period of time corresponding to y bits, to transition from the third state to the first state.

The CAN communication controller can communicate with CAN communication controller(s) which are not suitable for transmitting the second type of frame and vice versa.

According to a second aspect of the present disclosure there is provided a monolithic integrated circuit comprising at least one processor and memory, and the CAN communication controller of the first aspect.

The at least one processor may execute software which provides data for communication by the CAN communication controller.

The monolithic integrated circuit may be a microcontroller or a system on a chip.

According to a third aspect of the present disclosure there is provided a vehicle (such as a motor vehicle), industrial system or medical system comprising a CAN bus, and a plurality of CAN nodes connected to the CAN bus. At least one of the CAN nodes comprises the CAN communication controller of the first aspect.

According to a fourth aspect of the present disclosure there is provided a method of operating a CAN communication controller for transmitting first and second types of frames, wherein the first type of frame is used to transmit event-triggered communication data and the second type of frame is used to transmit best effort traffic data. The method comprises transmitting a frame of the second type having a given identifier and, in response thereto, delaying arbitration of a following frame (such as the immediately following frame) of the second type having the given identifier, and not delaying arbitration of a frame of the first type.

The method may comprise not delaying arbitration of a frame of the second type having another, different identifier to the given identifier.

The method may be a hardware-implemented method. The method may be a software-implemented method.

BRIEF DESCRIPTION OF THE DRAWINGS

Certain embodiments of the present disclosure will now be described, by way of example, with reference to the accompanying drawings, in which:

FIG. 16 is a schematic diagram of a motor vehicle and a CAN network deployed in the motor vehicle.

DETAILED DESCRIPTION

Data transmitted in a CAN may be generally divided into two types, namely event-triggered communication data having bounded or specified latency requirements, and data having no bounded latency. Data having no bounded latency (herein referred to as "best effort traffic" or simply "BE traffic") includes diagnostic data, software download, data from Ethernet-CAN gateways and data shaped by higher-level software (e.g., TCP).

Communication on a CAN may be configured to handle best effort traffic by shaping the best effort traffic as event-triggered data. This approach, however, tends to be inefficient with CAN bus utilization limited to about 70%. By contrast, communication on an Ethernet (for example in AVB and TSN) can be optimized for coexisting event-triggered and best effort traffic. In such networks, QoS allows for up to 100% bus utilization.

The present disclosure seeks to provide apparatus for and a method of transmitting best effort traffic in a CAN without impacting event-triggered communication, while maximising bus utilization.

This can have one or more benefits, such as allowing quicker diagnostics, allowing fewer CAN buses to be used and allowing simpler CAN-Ethernet gateways to be employed since no translation to event triggered traffic is required.

As will be explained hereinafter, a mechanism can be used which can distribute available bandwidth fairly between nodes on CAN bus, allowing node-based control of weight of traffic. The mechanism can be employed by nodes that support CAN 2.0, CAN FD or CAN XL communication. Moreover, the nodes on a CAN bus need not know whether other nodes support the mechanism.

Figure 1:
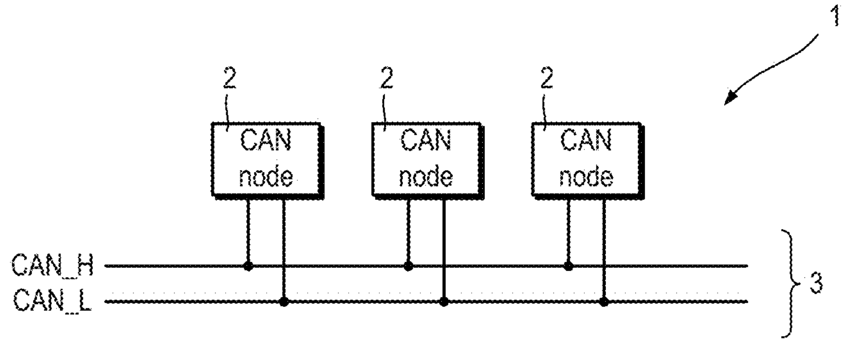
FIG. 1 is a schematic diagram of a CAN network including CAN nodes.

Referring to FIG. 1, a CAN system 1 is shown. The CAN system 1 includes at least two CAN nodes 2 connected to a CAN bus 3 comprising low and high lines CAN_L, CAN_H.

Figure 2:
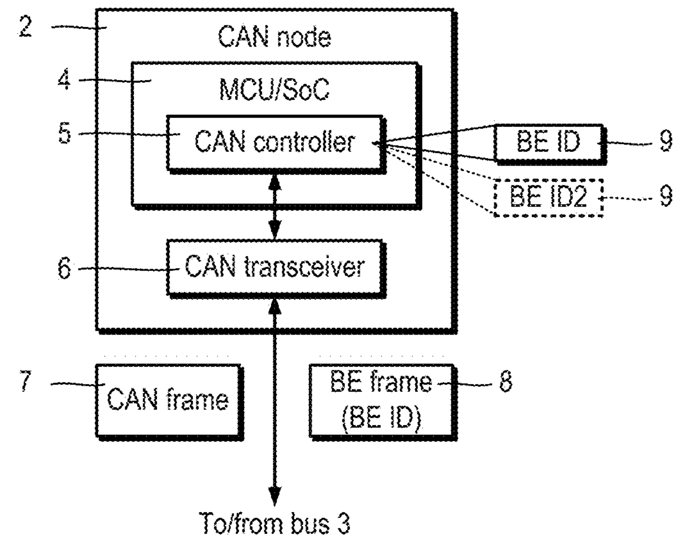
FIG. 2 is a schematic block diagram of a CAN node capable of transmitting normal event-triggered CAN frames and best effort frames.

Referring to FIG. 2, a CAN node 2 comprises a microcontroller (MCU) or system-on-a-chip (SoC) 4. The CAN node 2 comprise a CAN communication controller 5 (herein referred to simply as "CAN controller"), which can take the form of a peripheral module in the microcontroller or system-on-a-chip 4, and a CAN transceiver 6. The CAN transceiver 6 also be included in the microcontroller or system-on-a-chip 4.

The CAN controller 5 can transmit event-triggered, latency bounded CAN frames 7 (herein referred to as a "normal frame" or "a first type of frame"), and CAN frames 8 having no bounded latency (herein referred to as a "best effort frame", "BE frame" or "second type of frame"). As will be explained in more detail hereinafter, best efforts (BE) are used to transmit BE frames 8 and to distribute CAN bus bandwidth fairly between nodes 2 and, when a CAN controller 5 has BE frames 8 to transmit, bus arbitration is controlled by a BE FSM 40 (FIG. 6), whereas bus arbitration for normal frames remains unchanged.

Figure 7:
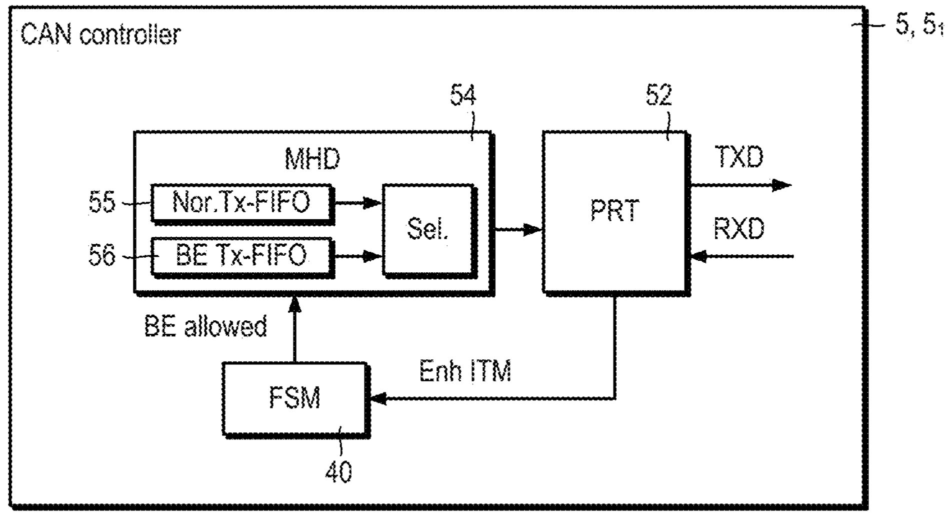
FIG. 7 is a schematic block diagram of a first CAN communications controller.

Each CAN controller 5 has its own one or more best effort CAN identifiers 9, for example, lying in a range of available CAN identifier values or specified in a table (not shown) of CAN identifier values or defined indirectly by the identifiers of the CAN frames that application software (not shown) stores in a dedicated transmit resource, e.g., BE Tx-FIFO 56 (FIG. 7). Expressed differently, if a CAN controller 5 has a dedicated BE transmit resource, all frames coming from the transmit resource will be transmitted as BE frames, independently of their identifier.

Figure 3:
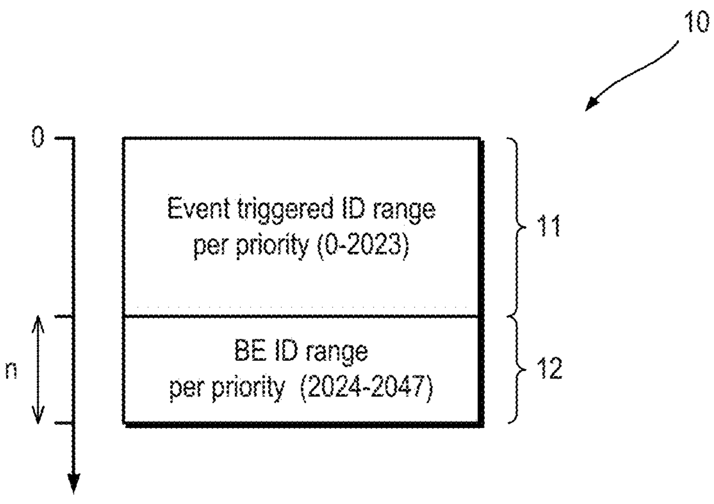
FIG. 3 is an example of a range of identifier values.

Referring also to FIG. 3, a range 10 of CAN ID values is shown which includes first and second ranges 11, 12 of CAN ID values. The first range 11 of CAN ID values are reserved for event-triggered communication, i.e., for normal frames 7. The second range 12 of CAN ID values are of lower priority (by virtue of having larger values) and are used for best effort traffic, i.e., for BE frames 8. CAN ID values in the second range are referred to as "best effort CAN identifiers" or simply "BE IDs".

For N nodes 2 in the network 1, a BE identifier range of N CAN addresses (i.e., CAN identifiers) are assigned to the N nodes 2. Each identifier is unique (in the network) for each node 2, where $0 \leq n \leq N-1$. Thus, in the case of CAN 2.0 in which an 11-bit identifier is used, a BE identifier ID(n) for the nth node is $ID(n)=2048-N-n$. Therefore, for 24 nodes, the BE identifier range 12 is from 2024 to 2047.

Using the lowest-priority CAN IDs for best effort frames can help to avoid any effect on the higher-priority, scheduled CAN traffic. As will be explained in more detail hereinafter, the CAN controller 5, having transmitted a frame 8 of BE traffic using a BE ID 9, temporarily suppresses using its BE ID 9 for arbitration. This gives other nodes 2 with other, e.g., lower priority, BE IDs 9 the chance to send their BE frame 8.

Best effort frames 8 need not necessarily have a low priority or a lower priority than normal frames 7.

Figure 4:
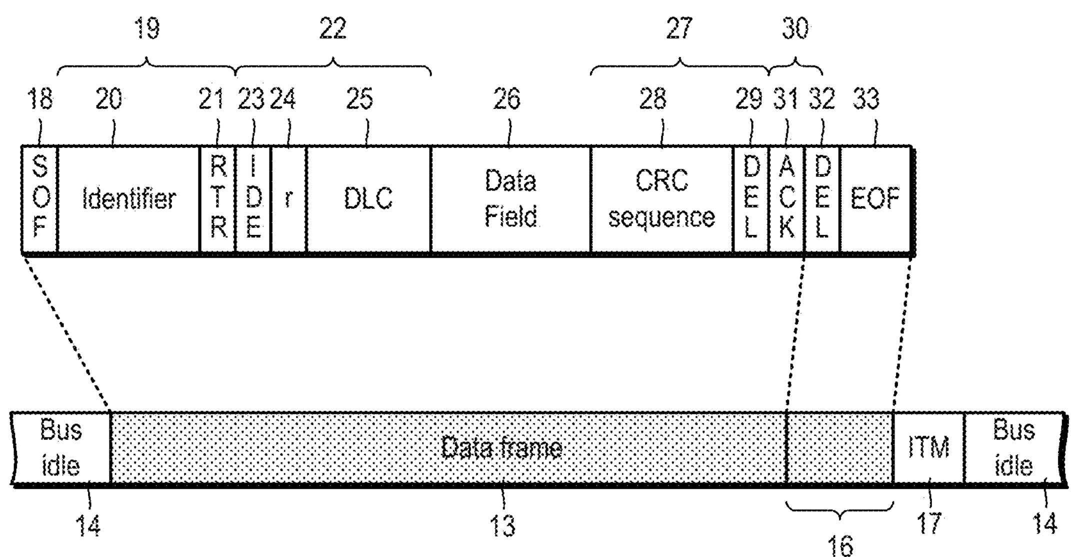
FIG. 4 is a CAN frame, an example of a CAN frame in the form of a standard CAN frame which includes ITM.

FIG. 4 illustrates a CAN data frame 13 interposed between bus idle 14. The CAN data frame 13 can take the form of a CAN 2.0 (or "standard") data frame, a CAN-FD frame or CAN-XL frame. All CAN frame formats comprising an end portion 16 of the CAN frame 13 and ITM 17.

Referring to FIG. 4, the CAN data frame 13 includes a start of frame bit 18, an arbitration field 19 comprising an identifier 20 and remote transmission request (RTR) bit 21, a control field 22 comprising identifier extension bit (IDE) 23, reserved bit 24 and data length code (DLC) fields 25, a data field 26, a CRC field 27 comprising CRC sequence 28 and CRC delimiter 29, an ACK field comprising an ACK slot 31 and an ACK delimiter 32, and end-of-frame 33.

The identifier 20 not only identifies the message, but also indicates priority. In the standard frame format shown in FIG. 4, the identifier is 11-bits long. In extended frame format (not shown) of CAN 2.0 or CAN-FD (not shown), however, the identifier may be 11- or 29-bits long. In CAN-XL, the identifier is 11-bits long. The identifier 20 is used in normal frames 7 and for BE frames 8 (in other words, the identifier 20 for a BE frame 8 is the BE identifier 9).

Figure 5:
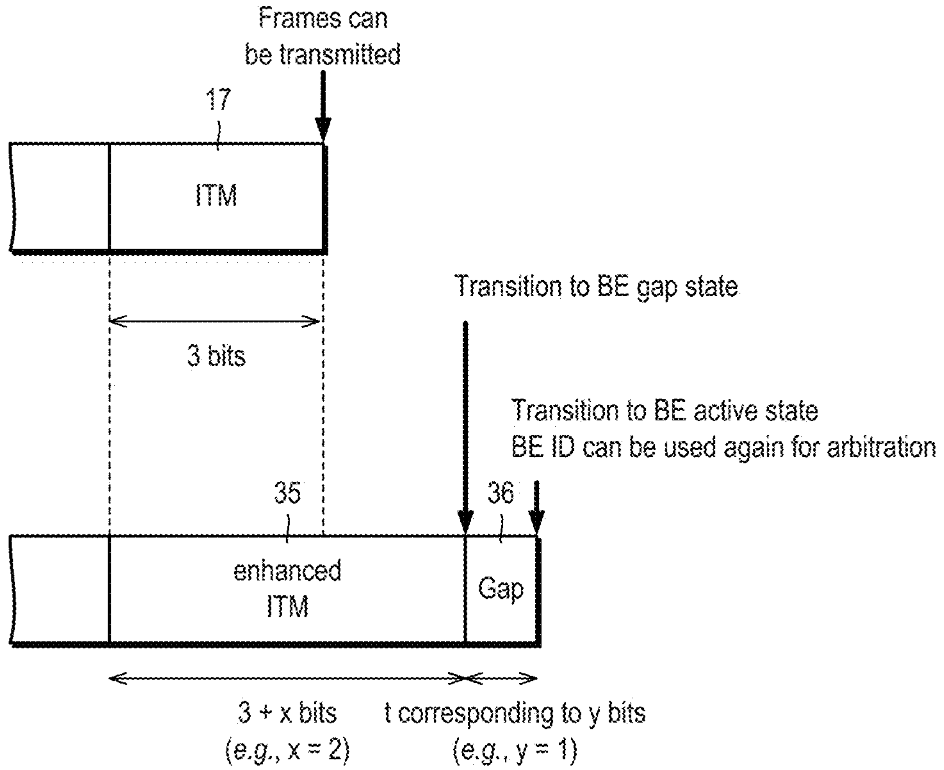
FIG. 5 is a diagram of a normal ITM and an extended ITM followed by a gap.

Referring also to FIG. 5, after the CAN controller 5 has transmitted a normal frame 7 and if it has further frame (normal or BE frame) to transmit, then it can start arbitration with the aim of transmitting the further frame after the end of ITM 17.

In the case in which the CAN controller 5 has transmitted a BE frame 8, an extended ITM 35 is used, extended by x bits, where x is 2 bits. The extended ITM 35 is used to ascertain whether there is any other node with lower BE-ID having data to transmit. Thus, a normal CAN frame 7 or a first BE frame 8 can be transmitted after the end of the ITM 17. However, any node 2 which sent a (first) BE frame 8 may be configured to wait at least for end of the extended ITM 35 before continuing with a second or subsequent BE frame 8 having the same CAN identifier 9, 20.

As will be explained in more detail hereinafter, when a BE frame 8 needs to be transmitted, whether a BE frame can be selected by the node for bus arbitration is controlled by a finite state machine (FSM) 40 (herein also referred to as "BE FSM") in FIG. 6 or other suitable logic.

Referring still to FIG. 5, the CAN controller 5 waits for a time (or "gap") 36 corresponding y bits. The gap 36 delays the transmission of the next BE frame 8 to allow proper enhanced ITM detection by all nodes. There is a possibility that a node could start transmitting a normal frame 7 close to the end of the enhanced ITM 35. In this rare case, some nodes 2 can stay in a wait state while others start their next round of next BE data transmission. The extended ITM 35 and gap 36 are only visible once per BE transmission round. Using this approach, just one single BE transmission talker can still utilize nearly 100% of the CAN bus.

Figure 6:
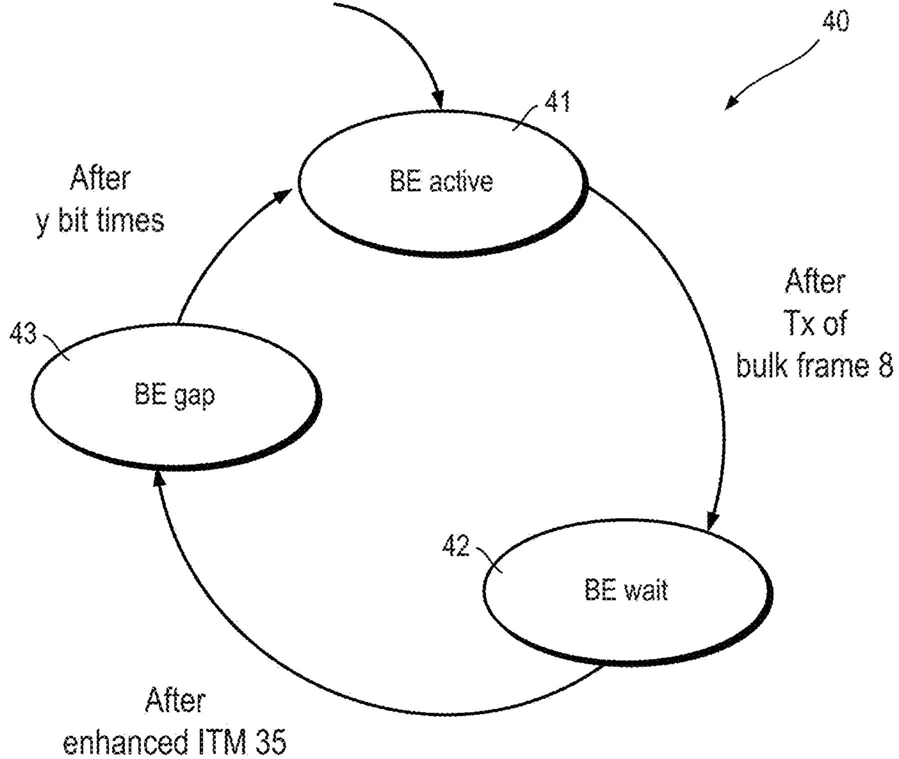
FIG. 6 is a state diagram of a finite state machine controlling when a CAN controller can use its best effort identifier.

Referring to FIG. 6, a BE FSM 40 in the CAN controller 5 (FIG. 2) control when the CAN controller 5 can use its BE identifier 9 (FIG. 2) for bus arbitration. If a CAN controller 5 (FIG. 2) is assigned or uses more than one BE identifier 9 (FIG. 2), then more than one FSM 40 is used, one for each BE identifier 9.

The BE FSM 40 has first, second and third states 41, 42, 43.

Referring to FIGS. 2 and 6, in a first state 41 (herein also referred to as "BE-active"), it is permitted to use the BE identifier 9 for bus arbitration with a view to transmitting a BE frame 8 using the same transmission selection and arbitration mechanism as normal frames, e.g., the priority based transmit resource selection.

After the BE frame 8 has been transmitted, the BE FSM 40 transitions to a second state 42 (herein also referred to as "BE-wait"). In the BE-wait state 42, it is not permitted to use the BE identifier 9. The BE-wait state 42 is used for extended ITM 35 (FIG. 5) detection.

At the end of the extended ITM 35 (FIG. 5), the BE FSM 40 transitions to a third state 43 (herein also referred to as "BE-gap"). In the BE-gap state 43, it is still not permitted to use the BE identifier 9. The BE-gap state 43 is used to compensate for inaccuracies of ITM measurement in different nodes on the physical CAN bus.

As hereinbefore described, the enhanced ITM 35 (FIG. 5) can be 5-bits long (i.e., x=2) and the gap 36 (FIG. 5) can be a period of time t that corresponds to 1 bit (i.e., y=1).

The value of x and the period of time t is fixed for the network 1, i.e., is common to all nodes 2 (FIG. 1) on the bus 3. The values may differ, however, from bus to bus. The value of x and the period of time t can be configurable, for example, via configuration registers (not shown) in the CAN controller 2 (FIG. 1).

Referring to FIG. 7, a first CAN controller 51 is shown.

The BE FSM 40 can be implemented in such a way that it is effectively integrated into a CAN protocol engine. This can help to reliably detect the enhanced ITM 35 (FIG. 5). The BE FSM 40 can be implemented in hardware, i.e., in hardware logic.

The first CAN controller 51 includes a CAN protocol engine (PRT) 52, the BE FSM 40, a CAN message handler (MHD) 54 which includes at least two transmit resources (or "Tx-FIFO") 55, 56 including a first transmit resource 55 for normal traffic and a second transmit resource 56 for BE traffic. Defining a resource for BE traffic has the benefit that there is no head of chain blocking, in this case, the BE ID 9 is indirectly defined by the CAN frames placed by software in this resource for transmission. The message handler 54 also includes a selector 57 for selecting a transmit buffer 55, 56 as a source of data to pass to the protocol engine 52 based on the presence of data in the transmit resource and priority. The CAN protocol engine 52 and CAN message handler 54 are implemented in hardware.

The CAN transceiver 6 (FIG. 2) outputs a CAN receive data signal RXD which is passed to the PRT 52. The CAN protocol engine 52 is arranged to inspect the receive data signal RXD to detect enhanced ITM 35 and, if so detected, output an enhanced ITM detected signal Enh-ITM to the BE FSM 40.

The BE FSM 40 waits until it is in the BE-active state 41 (FIG. 6) before signalling to the message handler 54 that transmission of a BE frame 8 (if present) in the transmit buffer 56 can occur.

The BE allowed signal can be used in the message handler 54 for a special CAN ID or dedicated transmit resource 56.

The message handler 54 includes logic (not shown) arranged to exclude the resource 56 and BE ID 9 while BE-allowed signal is 0 to prevent BE frames 8 being provided to the CAN protocol engine 52 for arbitration except in BE active state.

The BE FSM 40 does not affect transmission of normal frames 7 (FIG. 2). Normal frame transmission is still possible after normal ITM 17 (FIG. 5).

Figure 8:
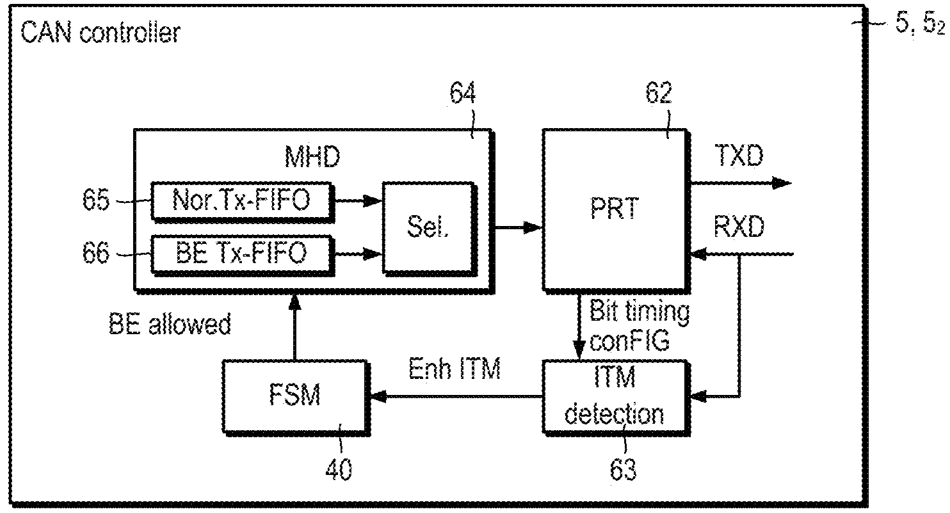
FIG. 8 is a schematic block diagram of a second CAN communications controller.

Referring to FIG. 8, a second CAN controller 52 is shown.

ITM detection can be done independently of the CAN protocol engine, particularly when longer times (e.g., x>2 and gap time t corresponds to more than y=1) are defined. In this case, the BE FSM 40 can be implemented in software, supported by timers.

The second CAN controller 52 includes a CAN protocol engine (PRT) 62, an enhanced ITM detection unit 63, the BE FSM 40, and a CAN message handler (MHD) 64 which includes at least two transmit resources (or "Tx-FIFO") 65, 66 including a first transmit resource 65 for normal traffic and a second transmit resource 66 for BE traffic. The CAN protocol engine 62 and CAN message handler 64 are implemented in hardware.

The CAN transceiver 6 (FIG. 2) outputs a CAN receive data signal RXD which is passed to the PRT 62 and to the enhanced ITM detection unit 63. The CAN protocol engine 62 can output bit timing configuration to allow the ITM detection unit 63 to determine the duration of one bit.

The enhanced ITM detection unit 63 is arranged to inspect the receive data signal RXD to detect enhanced ITM phase 35 (i.e., by sampling 3+y recessive bits) and, if so detected, outputs an enhanced ITM detected signal Enh-ITM to the BE FSM 40.

The BE FSM 40 waits until it is in the BE-active state 41 (FIG. 6) before signalling to the message handler 64 that bus arbitration to transmit a BE frame 8 (if present) in the transmit buffer 65 can occur.

The BE allowed signal can be used in the message handler 64 for a special CAN ID or a dedicated transmit resource.

The BE FSM 40 does not affect transmission of normal frames 7 (FIG. 2). Normal frames 7 (FIG. 2) is still possible after normal ITM 17 (FIG. 5).

The message handler 64 includes logic (not shown) arranged to prevent BE frames 8 being provided to the CAN protocol engine 62 for arbitration except in BE active state.

Simulations

FIGS. 9 to 15 illustrate simulations using Python script showing transmission of BE traffic in a model of a CAN network without and with the approach hereinbefore described.

The model includes six nodes. Three of the nodes, first node Node 1, second node Node 2 and third node Node 3, transmit normal frames containing respective amounts (SIZE) of data and respective repetition rates (REP). Three of the nodes, fourth node Node 4, fifth node Node 5 and sixth node Node 6, transmit only BE traffic containing respective amounts (SIZE) of data.

First Node

ID=100, SIZE=30, REP=1 ms

ID=101, SIZE=1000, REP=2.5 ms

Second Node

ID=200, SIZE=1200, REP=3 ms

ID=201, SIZE=900, REP=3 ms

ID=203, SIZE=100, REP=3 ms

Third Node

ID=300, SIZE=64, REP=3 ms

ID=301, SIZE=1550, REP=3 ms

Fourth Node

ID=804, SIZE=600

Fifth Node

ID=805, SIZE=600

Sixth Node

ID=806, SIZE=600

Base Scenario

Figures 9, 10:
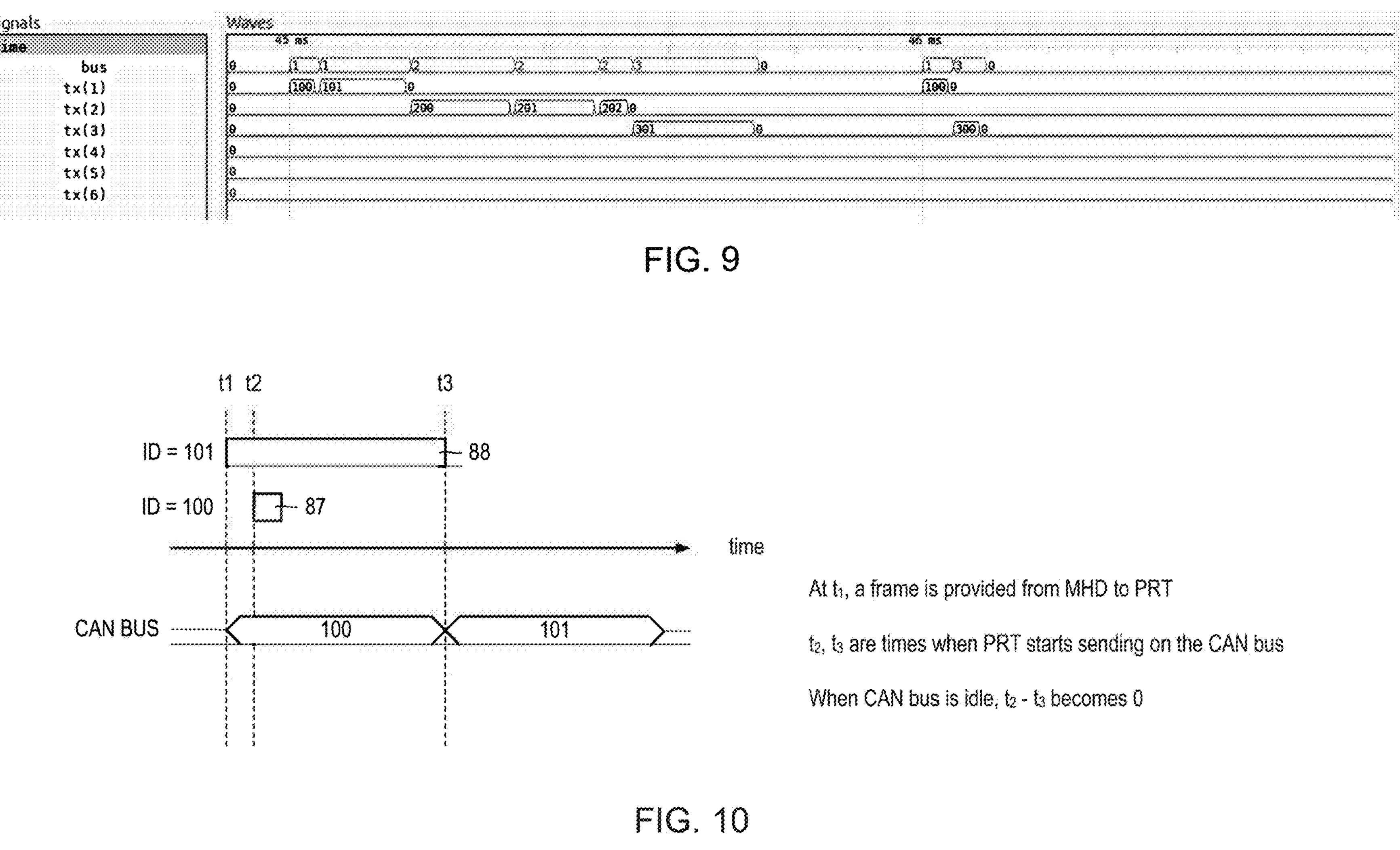
FIG. 9 is a diagram of simulated levels on a CAN bus and transmit lines of six nodes in a base scenario.
FIG. 10 is a diagram of transmission of two frames, of different priorities.

FIG. 9 illustrates which node currently transmits levels on the CAN bus bus, and which CAN ID is currently under transmission by an individual node tx(1), . . . , tx(6). The ID=0 is simulation specific and means no activity. In total, the first, second and third node generate normal, event triggered traffic taking up 60% bus load.

The wait time is the time between software supplies the frame to the transmit resource and the frame being transmitted over the CAN bus.

FIG. 10 illustrates how the transmit latency tx_latecy is calculated. In this example of one node at t1 there are two frames 87, 88 with ID=100 and ID=101 available in the message handler MHD for transmission. At t2, the protocol engine PRT brings the frame 87 with ID=100 onto the bus. After the end of this transmission, at t3, the frame 88 with ID=101 is sent on the bus. The tx_latecy, i.e., t2−t1 for the first frame 87 (with ID=100) and t3−t1 for the second frame 88 (ID=101), is the waiting time of the frame in the CAN controller.

Figure 11:
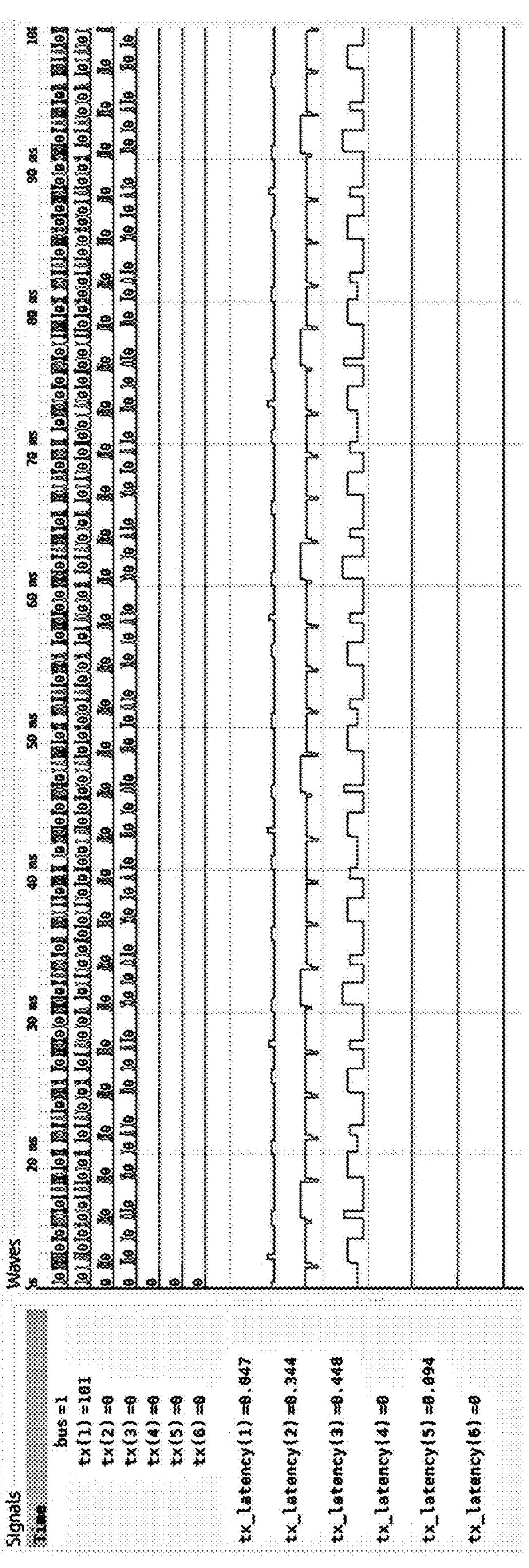
FIG. 11 is a diagram of simulated levels on a CAN bus, transmit lines of six nodes, and wait times for the six nodes in a base scenario for 50% bus utilization.

FIG. 11 illustrates the levels on the CAN bus bus and transmit lines tx(1), . . . , tx(6) for each respective node, and the wait times tx_latecy(1), . . . , tx_latecy(6) for each respective node in the base scenario. The latency distribution correlates with the bus priority IDs of the frames.

Overload Scenario with Strict Priority (without BE Traffic Support)

Figure 12:
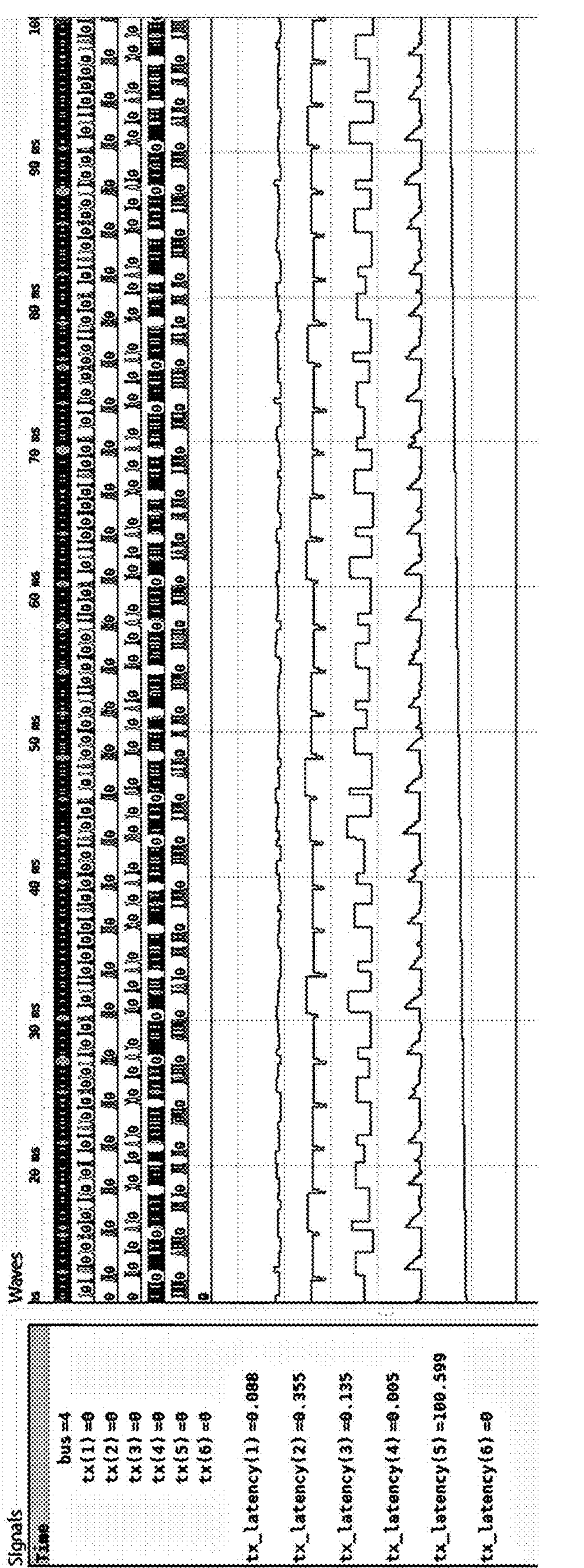
FIG. 12 is a diagram of simulated levels on a CAN bus, transmit lines of six nodes, and wait times for the six nodes in an overload scenario with strict priority without BE traffic support.

FIG. 12 illustrates the levels on the CAN bus bus and transmit lines tx(1), . . . , tx(6) for each respective node, and the wait times tx_latecy(1), . . . , tx_latecy(6) for each respective node in an overload scenario with strict priority without BE traffic support (i.e., without BE enabled).

Each of the fourth, fifth and sixth nodes Node 4, Node 5, Node 6 try to send about additional 30% bus load. The bus loads for the first, second and third nodes Node 1, Node 2, Node 3 are the same as in the base scenario. The bus is overloaded, and it is expected that not all BE frames are transmitted in time.

The forth node Node 4 is able to send all its BE frames due the lower ID, as evidenced by the low numbers on tx_latecy(4). The fifth node Node 5 takes the remaining 10% of free bus, but is not able to send all its BE frames, as evidenced by the continuously increasing latency on tx_latecy(5). The sixth node Node 6 does not transmit any of its BE frames, as it has the lowest ID.

Overload Scenario with Strict Priority (with BE Traffic Support)

Figures 14, 15:
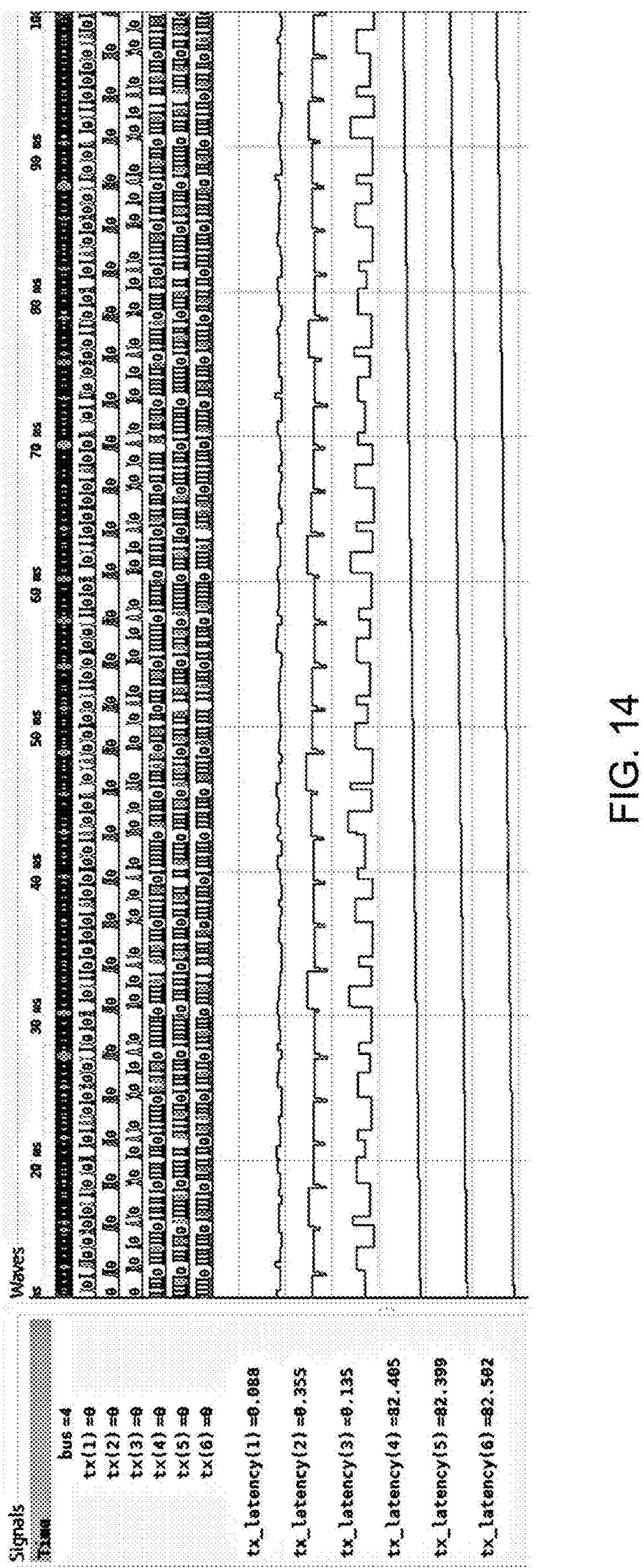
FIG. 14 is a diagram of simulated levels on a CAN bus and transmit lines of six nodes in an overload scenario with strict priority without BE traffic support.
FIG. 15 is a diagram of simulated levels on a CAN bus and transmit lines of six nodes in an overload scenario with strict priority with BE traffic support.

FIG. 14 illustrates the levels on the CAN bus bus and transmit lines tx(1), . . . , tx(6) for each respective node, and the wait times tx_latecy(1), . . . , tx_latecy(6) for each respective node in an overload scenario with BE traffic support (i.e., with BE enabled).

Again, each of the fourth, fifth and sixth nodes Node 4, Node 5, Node 6 try to send about additional 30% bus load. The bus loads for the first, second and third nodes Node 1, Node 2, Node 3 are the same as in the base scenario. The bus is overloaded, and so it is expected that not all BE frames transmitted in time.

Although the fourth, fifth and sixth nodes Node 4, Node 5, Node 6 cannot send all scheduled BE frames, they are all able to send their BE frames fairly until the bus is full, this is visible by the continuously and equal for all three nodes Node 4, Node 5, Node 6 increasing latency on tx_latecy(5), tx_latecy(6), tx_latecy(7).

Comparison of Overload Scenario without and with BE Traffic Support

Figure 13:
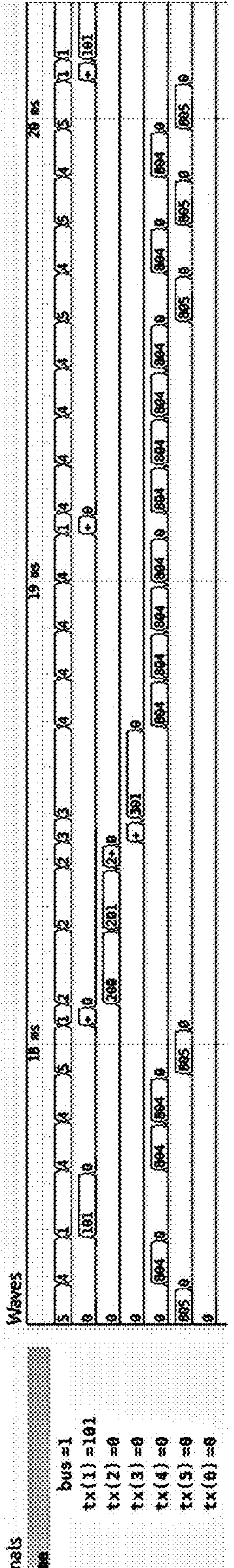
FIG. 13 is a diagram of simulated levels on a CAN bus, transmit lines of six nodes, and wait times for the six nodes in an overload scenario with strict priority with BE traffic support.

FIG. 13 is a detailed view of FIG. 12 and illustrates levels on the CAN bus bus, and transmit lines tx(1), tx(2), tx(3), tx(4), tx(5), tx(6) for each respective node in the overload scenario without BE traffic support.

FIG. 13 shows that the fifth node Node 5 only succeeds in accessing the bus when the fourth node Node 4 is quiet, and that the sixth node Node 6 never wins arbitration.

FIG. 15 is a detailed view of FIG. 14 and illustrates levels on the CAN bus bus, and transmit lines tx(1), tx(2), tx(3), tx(4), tx(5), tx(6) for each respective node in the overload scenario with BE traffic support.

FIG. 15 shows that although the fourth, fifth and sixth nodes Node 4, Node 5, Node 6 send some of their scheduled BE frames fairly until the bus is full. FIG. 15 also shows that after the sixth node Node 6 has transmitted its BE frame (indicated by an arrow), there is always an extended ITM and the fourth, fifth and sixth nodes Node 4, Node 5, Node 6 are allowed to send BE frames again. After this, arbitration between fourth, fifth and sixth nodes Node 4, Node 5, Node 6 takes place based on the normal strict priority scheme.

Applications

The CAN controllers 5 herein described can be used in automotive and industrial applications.

Referring to FIG. 16, a motor vehicle 100 is shown in which the CAN network 1 is deployed.

Modifications

It will be appreciated that various modifications may be made to the embodiments hereinbefore described. Such modifications may involve equivalent and other features which are already known in the design, manufacture and use of CAN communication controllers and component parts thereof and which may be used instead of or in addition to features already described herein. Features of one embodiment may be replaced or supplemented by features of another embodiment.

The approach can be implemented in software.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A controller area network (CAN) communication controller for transmitting first and second types of frames, wherein the first type of frame is used to transmit event-triggered communication data and the second type of frame is used to transmit best effort traffic data, the CAN communication controller configured, in response to transmitting a frame of the second type having a given identifier, to delay arbitration of a following frame of the second type having the given identifier, and not to delay arbitration of a frame of the first type, wherein:

the CAN communication controller comprises:

a CAN protocol engine;

a detector for detecting an end of an enhanced intermission (ITM) that includes ITM and x bits;

at least one finite state machine including a finite state machine associated with the given identifier which includes at least a first state in which bus arbitration for the second type of frame having the given identifier is allowed and a second state in which bus arbitration for the second type of frame is not allowed; and a message handler which includes a transmit resource for data best effort traffic data having the given identifier;

the finite state machine is configured to, in response to the CAN communication controller transmitting the frame of the second type having the given identifier, to transition from the first state to the second state, the detector is configured to, in response to detecting the end of the enhanced ITM, signal the end of the enhanced ITM to the finite state machine, and the finite state machine is configured to, in response the detector signalling the end of the enhanced ITM, transition out of the second state; and the finite state machine is configured to transition out of the second state into a third state in which bus arbitration for the second type of frame having the given identifier is not allowed, and the finite state machine is configured to, in response to waiting a period of time corresponding to y bits, transition from the third state to the first state.

2. The CAN communication controller of claim 1, wherein the CAN communication controller is configured, in response to transmitting the frame of the second type having the given identifier, not to delay arbitration of a frame of the second type having a, different identifier from the given identifier.

3. The CAN communication controller of claim 1, wherein the CAN communication controller is configured, in response to transmitting the frame of the second type having the given identifier, to delay arbitration of an immediately following frame of the second type of frame having the given identifier.

4. The CAN communication controller of claim 1, wherein the first type of frame has an identifier assignable from a first, predetermined set of identifier values, and the second type of frame has an identifier assignable from a second, predetermined set of identifier values.

5. The CAN communication controller of claim 1 is configured to delay arbitration by waiting a first period of time corresponding to the x bits after intermission (ITM).

6. The CAN communication controller of claim 5, wherein x=2.

7. The CAN communication controller of claim 1 is further configured to wait a second period of time corresponding to the y bits.

8. The CAN communication controller of claim 7, wherein y=1.

9. A monolithic integrated circuit comprising:

at least one processor;

memory; and the controller area network (CAN) communication controller of claim 1.

10. A motor vehicle comprising:

a controller area network (CAN) bus; and a plurality of controller area network (CAN) nodes connected to the CAN bus, wherein at least one of the CAN nodes comprises the CAN communication controller of claim 1.

11. A method of operating a controller area network (CAN) communication controller for transmitting first and second types of frames, wherein the first type of frame is used to transmit event-triggered communication data and the second type of frame is used to transmit best effort traffic data, the method comprising:

transmitting a frame of the second type having a given identifier and, in response thereto:

delaying arbitration of a following frame of the second type having the given identifier;

not delaying arbitration of a frame of the first type;

executing a message handler which includes a transmit resource for data best effort traffic data having the given identifier;

transitioning a finite state machine from a first state to a second state, wherein the finite state machine is associated with the given identifier, the finite state machine includes at least a first state in which bus arbitration for the second type of frame having the given identifier is allowed and a second state in which bus arbitration for the second type of frame is not allowed;

detecting an end of an enhanced intermission (ITM) that includes ITM and an additional x bits;

in response to detecting the end of the enhanced ITM, signalling the end of the enhanced ITM to the finite state machine, in response signalling the end of the enhanced ITM, transitioning the finite state machine out of the second state;

transitioning the finite state machine out of the second state into a third state in which bus arbitration for the second type of frame having the given identifier is not allowed; and in response to waiting a period of time corresponding to y bits, transitioning the finite state machine from the third state to the first state.

12. The method of claim 11, further comprising:

not delaying arbitration of a frame of the second type having a different identifier from the given identifier.

* * * * *